June 22, 1965  A. M. GORBATY  3,190,069
SPACE VEHICLE CONTROL SYSTEM
Filed Jan. 28, 1963  2 Sheets-Sheet 1

INVENTOR.
ARTHUR M. GORBATY
Beau, Brooks,
Buckley & Beau
ATTORNEYS

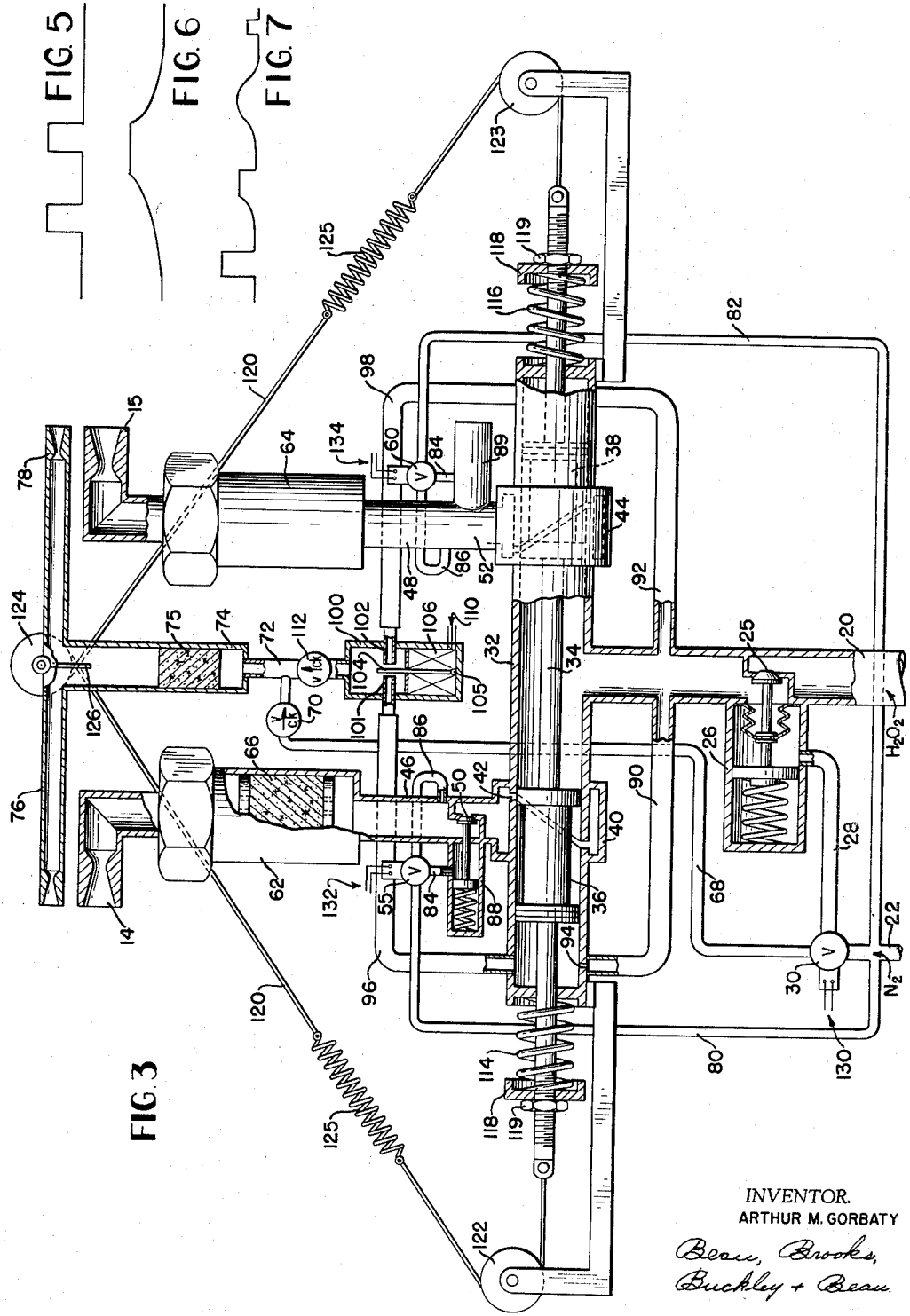

3,190,069
SPACE VEHICLE CONTROL SYSTEM
Arthur M. Gorbaty, Snyder, N.Y., assignor to Bell
Aerospace Corporation, Wheatfield, N.Y.
Filed Jan. 28, 1963, Ser. No. 254,068
5 Claims. (Cl. 60—35.6)

This invention relates to air and space vehicle attitude control devices, and more particularly to attitude control systems employing rocket or reaction motors such as for missiles, satellites, and other space craft as discussed for example in U.S. Patent 2,974,594.

It is an object of the present invention to provide an improved attitude control system as aforesaid for use in connection with gas-generative type reaction motor systems, wherein the correcting reactive forces may be more precisely controlled to be proportional to the corrections required, compared to the use of prior arrangements.

It is another object of the invention to provide an improved vehicle attitude correction and control system for the purposes aforesaid, wherein the attitude correcting reaction motors will be "proportionally" controlled in improved manner; whereby the generated reactive forces and durations of the same will be so effected as to provide improved transitional smoothness in the resulting vehicle attitude changes.

Otherwise stated, an object of the invention is to provide an improved control system as aforesaid which will avoid any over-controlling with resultant "hunting" and oscillation of the vehicle, and consequent waste of motive fuel.

Still another object is to provide an improved monopropellant fueled system such as a catalyst-bed hydrogen-peroxide type system as aforesaid, wherein pressured inert gas is electively employed to assist in control of the hydrogen-peroxide powered mechanism, and to scavenge and cool the catalyst beds between usages thereof.

Another and more specific object of the invention is to provide an improved system for the purposes aforesaid which will be structurally and functionally rugged, and sure and fool-proof in operation.

Other objects and advantages of the invention will appear from the specification hereinafter and the accompanying drawing, wherein:

FIG. 3 is an elevational view, with parts shown in section, of a typical reaction motor control unit of the invention shown in inoperative condition; multiples of which comprise the operative components of a system such as shown in FIGS. 1, 2;

Figure 4:
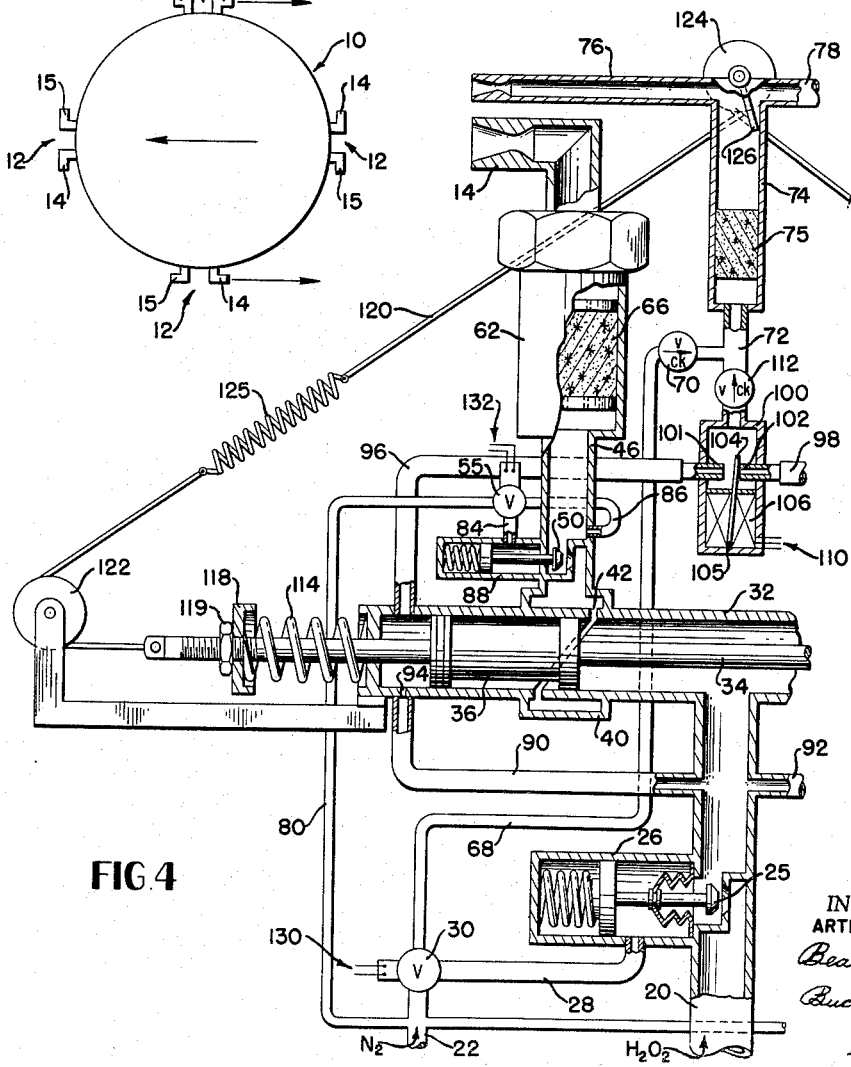

FIG. 4 corresponds to a portion of FIG. 3 but shows the unit in operative condition;

FIG. 5 graphically illustrates performance characteristics of typical prior art "bang-bang" type control systems;

FIG. 6 graphically illustrates control results involving gradated thrust effects, such as may be obtained by use of the present invention; and FIG. 7 illustrates a variety of control characteristics obtainable by use of the present invention.

Generally stated, the invention contemplates a space vehicle control system wherein provisions are made for utilizing signals to be received either from attitude sensors automatically detecting deviations of the vehicle attitude relative to the programmed attitude thereof, or from other manually or telemetered directing signals; and for translating such signals into corrective control effects, in improved manner. The attitude control system of the invention is of course applicable to control of the vehicle attitude about its roll, pitch, and yaw axes. Hence the over-all system will generally include deviation sensors, such as accelerometers, and/or directional signal receivers; signal amplifying devices; attitude-control reaction motors, all of which are well known in the art; as well as the improved motor control system of the present invention.

Figure 1:
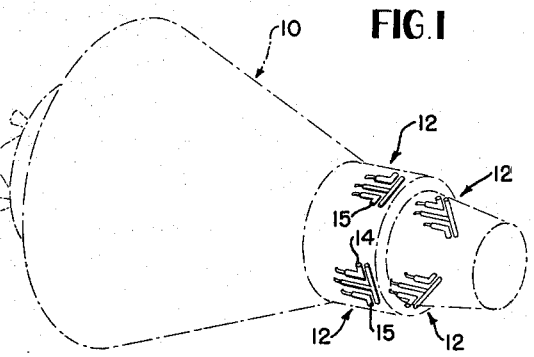
FIG. 1 is an illustration in perspective of a space vehicle equipped with reaction motor attitude control units of the invention.
Figure 2:
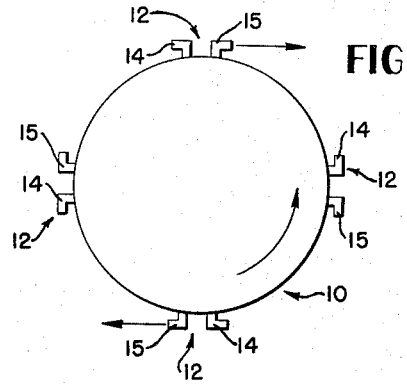
FIGS. 2 and 2a are schematic sectional views of the vehicle showing the controls in roll and yaw inducing operative conditions, respectively.
Figure 2A:
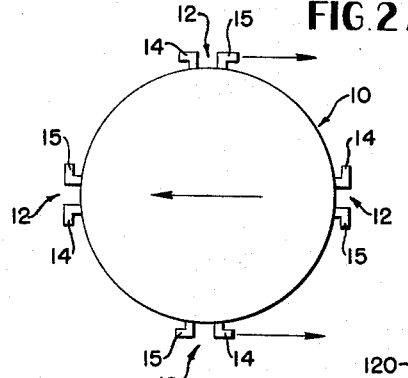

For example, as shown in FIGS. 1, 2, 2a, the system may be applied to a space vehicle such as is designated generally at 10 having vertically and horizontally diametrically opposed reaction motor units as indicated generally at 12; each unit including a pair of rocket motors having their reaction nozzles 14, 15 oppositely directed tangentially of the vehicle sectional profile. Thus, it will be appreciated that, as illustrated in FIGS. 2, 2a, selective operation of the reaction nozzles according to their perimetrical positions on the vehicle, will produce thrust effects tending to roll or pitch or yaw the vehicle, as may be called for. For example, as illustrated by the directional arrows in FIG. 2, cooperative operation of the nozzles 15—15 at opposite sides of the vehicle will cause the vehicle to roll. As illustrated at FIG. 2a, simultaneous operation of jets 14–15 at the top and bottom of the vehicle will cause the vehicle to yaw. Similarly, simultaneous operation of jets 14–15 at opposite sides of the vehicle will cause it to pitch according to how the actuated nozzles are directed. As previously stated, the present invention relates to means for controlling actuation of the motors to obtain the above mentioned results, and a detailed description of the control system will now be provided.

As shown in the drawing herewith, the control system is powered by a supply of liquid monopropellant, such as hydrogen-peroxide, which is carried by the vehicle in a suitable tank or tanks; and a supply of pressured inert gas such as nitrogen, carried in a separate tank or tanks. For simplification of the following specification, monopropellant and inert gas references hereinafter will be identified simply as "peroxide" and "nitrogen," respectively. The peroxide supply is connected into each motor unit by means of a conduit as indicated at 20, FIGS. 3, 4; and the ntrogen supply lines connect to the motor units by means of conduits as indicated at 22, FIGS. 3, 4. Referring now to any one of the motor units specifically, the conduit 20 thereof is controlled by a valve 25; the valve 25 being actuated by a spring-loaded piston-cylinder device 26 which is in turn controlled by a pressured nitrogen gas supply delivered through a conduit 28 under control of a valve 30, as will be explained in more detail hereinafter. The conduit 20 leads donwstream from the valve 25 into a shuttle valve cylinder 32 wherein a piston rod 34 carries a pair of spool pistons 36, 38. The spool 36 controls flow of peroxide from the central chamber portion of the cylinder 32 into a manifold 40 encircling the cylinder and arranged in fluid communication therewith by means of a diagonally running slot 42 through the cylinder wall.

Thus, it will be appreciated that FIG. 3 illustrates the mechanism as being in inoperative position, with the spool 36 in position closing the slot 42 from the source of hydrogen-peroxide in the central chamber portion of the cylinder. However, shifting of the spool unit to the left, such as shown in FIG. 4, will progressively uncover the slot 42 and permit flow of peroxide into the manifold 40. The spool 38 similarly cooperates with a second diagonally slotted portion of the cylinder 32 for control of flow of peroxide into a duplicate manifold 44. Manifolds 40, 44 communicate respectively with conduits 46, 48, which are under control of valves 50, 52, respectively; the valves 50, 52 being in turn nitrogen-pressure actuated under control of valves 55, 60, as will be explained in more detail hereinafter. The conduits 46, 48 lead respectively to catalyst bed chambers 62, 64 wherein appropriate catalysts are disposed as indicated at 66; the outlets from the catalyst chambers being connected respectively into the jet nozzles 14, 15 hereinabove referred to. Passage of hydrogen-peroxide through the beds 66 will result in decomposition of the hydrogen-peroxide and evolution of gas exhausting from the corresponding nozzle 14 or 15, as the case may be, as is well understood in the art, thereby producing the desired controlling thrust forces.

Control of the valve 25 and of the spool piston unit 34, 36 and 38 is effected by means of the inert gas system deriving power from pressured gas supply conduit 22. One branch of the conductor 22 leads to the valve 30 which is of the off-on two-way type; one outlet from the valve being connected into the conduit 26, and the other outlet connecting by means of a conduit 68 and through a check valve 70 into conduit 72 supplying a catalyst chamber 74. A catalyst bed 75 is disposed in the chamber 74, and the chamber terminates in oppositely directed jet nozzles 76, 78 which are arranged in paired relation with the nozzles 14, 15, respectively.

The gas supply conduit 22 includes branch conduits 80–82 which lead to the aforementioned control valves 55, 60, respectively. The valves 55, 60 are of the off-on two-way type for delivery of gas from the supply conduits alternatively to conduits 84, 86. The conduits 84 lead into cylinders 88, 89 controlling actuation of the aforementioned valves 50, 52, respectively; and the conduits 86 are connected in communication with the conduits 46, 48 leading to the catalyst chambers 62, 64, respectively.

The main peroxide supply conduit 20 is provided with oppositely directed branch conduits 90, 92 leading into communication with opposite ends of the shuttle cylinder 32; metering orifices being interposed at the connections as indicated at 94. Also, leading away from opposite ends of the shuttle cylinder 32, a pair of conduits 96, 98 are arranged to deliver jets of liquid hydrogen-peroxide to a servo valve mechanism as indicated at 100. This valve device may be for example of the type disclosed in Canadian Patent 652,468 dated November 20, 1962. The conduits 96, 98 terminate within the valve casing in the form of oppositely directed jet nozzles 101, 102, between which stands a flapper 104 which is either pivotally or spring mounted in the chamber as indicated at 105 so as to be free to oscillate between the nozzles and to thereby variably and differentially throttle the fluid flows therefrom. The flapper 104 is arranged to comprise the armature of a solenoid device, the winding of which is indicated at 106, and control of which is effected by signals sent to the coil through conductors 110. The valve chamber 100 is in open communication with conduit 72 under control of a check valve 112.

The spool-piston units 34, 36, 38 are spring-biased toward centered position in the cylinder 32 by means of oppositely acting compression springs 114, 116 bearing against opposite ends of the cylinder and adjustably connected to the piston rod by means of spring seats 118 and lock nuts 119. A cable 120 interconnects opposite ends of the piston rod 34, by training around pulleys 122, 123, 124; and includes a pair of tension springs 125, for slack take-up purposes. The pulley 124 is geared to a flip-flop valve 126 which when shifted directs flow of gas from the chamber 74 alternatively through nozzle 76 or 78.

The valve 30 is controlled by means of signals delivered thereto by means of conductors 130. The valves 55, 60 are controlled by signals delivered thereto by conductors 132–134, respectively, and as previously stated, the flapper valve 104 is controlled by signals delivered through conductors 110 to the solenoid 106. Thus, the basic control elements 30, 55, 60, and 104 are selectively operable by means of electrical signals coming from attitude sensors, programmed controls, or telemetered signals initiated either manually or automatically, or from any appropriate sources. In any case, the signals will be selectively conducted to the appropriate control elements of the present invention in accordance with the control effect required, and a typical control sequence and the effect thereof will now be described in detail.

Commencing from an inoperative condition of the system as illustrated by FIG. 3 herewith, a "starting" signal may typically be first received through the conductors 130 such as will actuate the valve 30 to open the way for passage of nitrogen from supply 22 into conduit 28 and the interior of cylinder 26 thereby biasing the piston thereof against its spring to cause the main peroxide valve 25 to open. This permits peroxide to enter the center and opposite end portions of cylinder 32 through the main conduit 20 and branch conduits 90, 92. This puts peroxide flow pressure (as metered by the orifices 94) against opposite sides of the flapper 104 and peroxide feeds to the catalyst chamber 75. Thus, the small nozzles 76, 78 are fired, but because the pressures at opposite sides of the flapper are equal the main system remains inoperative and only small jet streams of equal power issue from jets 76, 78. Signals are then applied to actuate valves 55, 60 so as to admit nitrogen into cylinders 88, 89; thereby opening valves 50, 52. This conditions the system for operation, although the spools 36, 38 block the peroxide passageways 42.

Reception of control signals at solenoid 106 will now act to bias the flapper 104 either to the right or left as viewed in FIG. 3. For example, if the signal is such as to bias the flapper to the right as shown in FIG. 4 the flapper will thereupon impose an increased throttling force against the jet 102 while relaxing its effect against the nozzle 101. The static pressure conditions interiorly of the conduits 96, 98 will thereby become unbalanced in favor of the pressure within conduit 98, whereby the previously established balancing of the spool piston 34 will be affected so as to cause the piston 34 to shift to the left as to the position shown in FIG. 4. This motion will cause the slot 42 of manifold 40 to be progressively uncovered so that peroxide may now flow from the central chamber portion of cylinder 32 through the slot 42, valve 50 and conduit 46 into the catalyst chamber 62 where it decomposes and generates large volume gas which proceeds to issue through jet 14. Reverse displacement of the flapper 104 will cause a pressure imbalance on the spool piston to develop such as to displace it toward the right as viewed in the accompanying drawing, whereby flow of peroxide through catalyst chamber 64 will be permitted, while the flow to chamber 62 is cut off. Thus, displacements of the flapper 104 in either direction away from its neutral or centered position will produce corresponding alternative operations of the jets 14, 15. Note that when the spool piston shifts to cause operation of either one of the main jets, the cable 120 moves with it and pulles the valve 126 to close off one of the auxiliary jets 76, 78 while directing all of the gas flow from the chamber 75 through the other jet which parallels the main jet which is in simultaneous operation, thus augmenting the thrust effect thereof. It will of course be appreciated that the signals coming to the solenoid 106 will not only be bi-directional but may also be of variable intensities, to provide for appropriate regulation of the flapper 104 to produce any desired degree of differential control of the pressure forces regulating the position of the spool piston in the cylinder 32. Hence, the system provides for not only alternative firings of the nozzles 14–15, but also for variable regulation of the thrust forces thereof.

It is a particular feature of the present invention that the nitrogen supply component thereof is operable not only to initially "condition" the peroxide components of the system as explained hereinabove, but also functions to scavenge the peroxide systems following each usage thereof. This effect is attained by arranging for delivery of firing termination control signals to the valve 30 in such manner as will adjust the valve so as to cut off supply of pressured nitrogen through the conduit 28, while at the same time diverting the pressurized nitrogen flow into conduit 68. At the same time signals are delivered to the valves 55, 60 in such manner as to cause these valves to open and thereby permit flow of pressured nitrogen into the catalyst chamber feed conduits 46, 48. Thus, coincident with stopping of the supply of peroxide to the main system, through closure of valve 25 in response to its spring action, nitrogen is permitted to flow through the catalyst beds 66 and 75 and through all of the appurtenances thereof, thereby scavenging these parts of the system of residual peroxide and/or decomposition products.

In connection with certain long range guidance problems, for example, or wherever most precise and fine control effects are prerequisite, the peroxide vernier system will be preferably employed in lieu of the main peroxide system. As previously stated, and as graphically illustrated by FIGS. 5, 6, 7, whereas prior art "bang-bang" type systems provide performance characteristics as illustrated by FIG. 5, the system of the present invention makes available a variety of improved type performance characteristics as illustrated by FIGS. 6, 7. Thus, the system of the present invention may be actuated to produce thrust effects truly proportional to the immediate control requirements. For example, the system may be actuated to provide a conventional "bang-bang" type control effect if desired. Or, the auxiliary and main power systems may be electively employed, and variable controlled, so as to produce resultant thrust effects of a wide variety of types. These include variable term and variable magnitude "bang-bang" effects as well as modifications thereof involving gradating the on-off effects to provide gradually accelerated or decelerated performance characteristics. Both the auxiliary and the main power systems operations may thus be modified in the case of the present invention, whereby the resultant thrust levels may if desired be made continuously variable in magnitude and duration within the power ranges of either the auxiliary system or the main system.

By way of further explanation a typical operation of the auxiliary or "vernier" system would be as follows. Valve 30 is first actuated, thereby opening valve 25 and permitting peroxide to flow through conduits 90, 92, 96, 98 and thence through the nozzles 101, 102 of the servo valve mechanism. Assuming the servo valve control at 110 to be inert, the peroxide flow through the catalyst 75 will generate gas flowing under equal pressures in opposite directions through nozzles 76, 78. Biasing of the servo valve flapper 104, by means of a signal imposed at 98 will now differentially increase-decrease the pressures within the chambers at opposite ends of the main piston valve 34, causing the piston to displace. Through means of the cable 120 this will cause the valve 126 to shift to one side or the other. Hence, the generated gas will now jet either from nozzle 76 or 78, depending upon the position of the valve 126.

Because the signal at 110 operates to bias the flapper 104, this signal may be regulated so as to produce any desired degree of biasing of the flapper 104, and hence any desired degree of displacement of the piston 34 and consequent displacement of the valve 126. Thus, the auxiliary nozzles 76, 78 are operable as a differential control system whereby the resultant effective directional thrust so produced, may be variably regulated from zero up to the maximum thrust power available to the auxiliary system. Then, whenever greater thrust effects are required they are attained simply by imposition of stronger signals on the servo valve mechanism whereby the piston rod 34 will be further displaced so as to open the appropriate slot 42 of the shuttle valve cylinder, thereby bringing into action the corresponding main catalyst chamber.

This operation of the main power system may also be brought into play and discontinued with either "bang-bang" or gradated control effects; and thus it will be appreciated that the large variety of performance characteristics illustrated by FIGS. 6 and 7 may be readily obtained by the mechanism of the invention. Whereas in the drawing herewith the nozzles 14, 76 and the nozzles 15, 78 are illustrated as being provided in the form of separate structures, it will of course be appreciated that the feed conduits thereto may be merged if preferred to provide in each case a single nozzle outlet. Also it will of course be appreciated that various other changes may be made with respect to the specific illustration and description of the invention hereinabove without departing from the spirit of the invention or the scope of the following claims.

I claim:

1. A thrust producing device for controlling a space vehicle operating beyond or in rarified earth's atmosphere, said device comprising: a reaction motor unit including a pair of oppositely directed main jet nozzles, a main catalyst chamber associated with each of said nozzles and having its outlet portion in flow-connected relation to the corresponding nozzle, an auxiliary catalyst chamber having oppositely directed outlet thrust nozzle devices arranged in common with said main jet nozzles, means for supplying a liquid monopropellant, means for separately supplying an inert gas under pressure, and a conduit and valving and control system for selectively feeding monopropellant and inert gas to said main and auxiliary catalyst chambers, said system including a main monopropellant supply conduit including a main propellant flow control device, a shuttle valve and conduit system interconnecting said supply conduit and said catalyst chambers, said shuttle valve having separate monopropellant delivery conduits leading therefrom to respective of said main catalyst chambers, delivery control valve devices controlling flow of monopropellant through said delivery conduits, said shuttle valve comprising a cylinder and dual piston means carried by a common piston rod to be reciprocable longitudinally within said cylinder and defining a central chamber portion between said piston means, said cylinder having outlet ports associated with each of said delivery conduits and the parts being so arranged that when said piston unit is in centered position within said cylinder passage of monopropellant from said central chamber portion to either outlet port is blocked, and whereby displacement of said piston unit away from its centered position will progressively open one of said outlet ports and permit flow of monopropellant into the associated delivery conduit, said monopropellant supply passage having branch outlets therefrom leading through metered orifices into opposite ends of said cylinder behind said pistons, branch outlet conduits leading from each end of said cylinder behind said pistons to a servo valve device wherein their respective discharges are arranged in the form of opposedly directed jets playing against opposite sides of a movable differentially throttling armature portion of said servo valve mechanism, the fluid chamber portion of said servo valve having its outlet flow-connected with said auxiliary catalyst chamber, said pressured gas supply means including a branch conduit arrangement wherein one of the branches thereof leads to a main control valve controlling delivery of inert gas to an actuator for said main monopropellant flow control device, another branch of said conduit system leading through a one-way check valve to said auxiliary catalyst chamber, and a pair of branch conduits running respectively to actuators for said monopropellant delivery control valves and alternatively into said monopropellant delivery conduits, valve means operably associated with said branch conduits and actuable to selectively direct pressured gas into said monopropellant delivery conduits and/or to actuate said delivery control valves, signal-responsive means associated with said servo valve armature and operable to bias the latter differentially relative to the opposed nozzles of said servo valve mechanism whereby to differentially regulate the static pressure acting within said shuttle valve cylinder against opposite ends of said piston unit thereby controlling the position of said piston unit in said valve cylinder and the passage of monopropellant into said main catalyst chambers, and signal reception means associated with said main control valve and with said auxiliary control valves and with said servo valve mechanism for controlling the operations thereof.

2. A thrust producing device for controlling a space vehicle operating beyond or in rarified earth's atmosphere, said device comprising: a reaction motor unit including a pair of oppositely directed main jet nozzles, a main catalyst chamber associated with each of said nozzles and having its outlet portion in flow-connected relation to the corresponding nozzle, an auxiliary catalyst chamber having oppositely directed outlet thrust nozzle devices arranged in common with said main jet nozzles, means for supplying a liquid monopropellant, means for separately supplying an inert gas under pressure, and a conduit and valving and control system for selectively feeding monopropellant and inert gas to said main and auxiliary catalyst chambers, said system including a main monopropellant supply conduit and a main propellant regulator valve, a shuttle valve and conduit system interconnecting said monopropellant supply and said catalyst chambers, said shuttle valve having separate monopropellant delivery conduits leading from said valve to respective of said catalyst chambers, delivery control valve devices controlling flow of monopropellant through said delivery conduits, said shuttle valve comprising a cylinder and dual piston means defining a central chamber portion therebetween and carried by a common piston rod to be reciprocable longitudinally within said cylinder, said cylinder having outlet ports associated with each of said delivery conduits and the parts being so arranged that when said piston unit is in centered position within said cylinder passage of monopropellant from said central chamber portion to either outlet port is blocked, and whereby displacement of said piston unit away from its centered position will progressively open one of said outlet ports and permit flow of monopropellant into the associated delivery conduit, said monopropellant supply passage having branch outlets therefrom leading through metered orifices into opposite ends of said cylinder behind said pistons, branch outlet conduits leading from each end of said cylinder behind said pistons to a servo valve device and having their respective discharges arranged in the form of oppositely directed jets playing against opposite sides of a movable jet throttling armature portion of said servo valve mechanism, the fluid chamber portion of said servo valve having its outlet flow-connected with said auxiliary catalyst chamber, said pressured gas supply means including a branch conduit arrangement wherein one of the branches thereof leads to a main control valve controlling delivery of inert gas to an actuator for said main monopropellant regulator valve, another branch of said conduit system leading through a one-way check valve to said auxiliary catalyst chamber, and a pair of branch conduits running respectively to actuators for said monopropellant delivery control valves and alternatively into said monopropellant delivery conduits, valve means operably associated with said branch conduits and actuable to selectively deliver pressured gas to said monopropellant delivery conduits and/or to actuate said delivery control valves, signal-responsive means associated with said servo valve armature and operable to bias the latter differentially against the opposed nozzles of said servo valve whereby to differentially regulate the static pressure acting within said shuttle valve against opposite ends of said piston unit thereby controlling the position of said piston unit in said valve and the passage of monopropellant into said main catalyst chambers, signal reception means associated with said main control valve and said auxiliary control valves and said servo valve mechanism for controlling the operations thereof, a by-pass valve associated with said auxiliary thrust nozzles and operable to selectively control flow to the latter, and means operably interconnecting said piston unit and said by-pass valve.

3. A thrust producing device for controlling a space vehicle operating beyond or in rarified earth's atmosphere, said device comprising: a reaction motor unit including a pair of oppositely directed main jet nozzles, main catalyst chamber associated with each of said nozzles and in flow-connected relation to said nozzles, an auxiliary catalyst chamber having oppositely directed outlet thrust nozzle devices arranged respectively in common with said main jet nozzles, means for supplying a liquid monopropellant, means for separately supplying an inert gas, and a conduit and valving and control system for selectively feeding monopropellant and inert gas to said main and auxiliary catalyst chamber means, said system including a servo valve means differentially operable to selectively control flow of monopropellant to said main and catalyst chambers for alternative operation of said main nozzles and for differential control of said auxiliary nozzles, whereby gradated thrust control effects are obtained, and signal reception means associated with said valve means for control thereof in response to signals transmitted thereto.

4. A thrust producing device for controlling a space vehicle operating beyond or in rarified earth's atmosphere, said device comprising: a reaction motor unit including a main jet nozzle, a main catalyst chamber associated with said nozzle and having its outlet portion in flow-connected relation to said nozzle, an auxiliary catalyst chamber having an outlet thrust nozzle arranged directionally in common with said main jet nozzle, means for supplying a liquid monopropellant, means for separately supplying an inert gas, and a conduit and valving and control system for selectively feeding monopropellant and inert gas to said main and auxiliary catalyst chambers, said system including a main monopropellant supply conduit and a main propellant regulator valve, a shuttle valve and conduit system interconnecting said monopropellant supply and said main catalyst chamber, said shuttle valve having a monopropellant delivery conduit leading from said valve to said main catalyst chamber, a delivery control valve controlling flow of monopropellant through said delivery conduit, said shuttle valve comprising a cylinder and piston means reciprocable longitudinally within said cylinder, said cylinder having an outlet port associated with said delivery conduit and the parts being so arranged that when said piston unit is in inoperative position within said cylinder passage of monopropellant from said supply conduit to said outlet port is blocked, and whereby displacement of said piston unit away from its inoperative position will progressively open said outlet port and permit flow of monopropellant into said delivery conduit, said monopropellant supply passage having a branch outlet therefrom leading through a metered orifice into one end of said cylinder behind said piston, a branch outlet conduit leading from said end of said cylinder behind said piston to a servo valve device, said servo valve having its outlet flow-connected with said auxiliary catalyst chamber, said gas supply means including a branch conduit arrangement wherein one of the branches thereof leads to a main control valve controlling delivery of inert gas to an actuator for said main monopropellant regulator valve, another branch of said conduit system leading through a one-way check valve to said auxiliary catalyst chamber, and a branch conduit running to an actuator for said monopropellant delivery control valve and alternatively into said monopropellant delivery conduit, valve means operably associated with said branch conduits and actuable to selectively delivery gas to said monopropellant delivery conduit and/or to actuate said delivery control valve, signal-responsive means associated with said servo valve and operable to bias the latter to differentially regulate the static pressure acting within said shuttle valve against opposite ends of said piston thereby controlling the position of said piston in said valve and the passage of monopropellant into said main catalyst chamber, signal reception means associated with said main control valve and said auxiliary control valves and said servo valve mechanism for controlling the operations thereof, a by-pass valve associated with said auxiliary thrust nozzle and operable to selectively control flow to the latter, and means operably interconnecting said piston and said by-pass valve for adjustment of the latter in response to motions of said piston.

5. A thrust producing device for controlling a space vehicle operating beyond or in rarified earth's atmosphere, said device comprising: a reaction motor unit including a pair of oppositely directed main jet nozzles, a pressured gas supply device associated with each of said nozzles and having its outlet portion in flow-connected relation to the corresponding nozzle, an auxiliary pressured gas device having oppositely directed outlet thrust nozzle devices arranged directionally in common with said main jet nozzles, and a conduit and valving and control system for selectively regulating supply of pressured gas to said main and auxiliary nozzles, said system including a shuttle valve and conduit system, said shuttle valve having separate delivery conduits leading from said valve to respective of said nozzles, delivery control valve devices controlling flow through said delivery conduits, branch conduits leading from each end of said shuttle valve cylinder to a servo valve device and having their respective discharges arranged in the form of oppositely directed jets playing against opposite sides of a movable jet throttling armature portion of said servo valve mechanism, the fluid chamber portion of said servo valve having its outlet flow-connected with said auxiliary nozzles, signal responsive means associated with said servo valve armature and operable to bias the latter differentially against the opposed nozzles of said servo valve whereby to differentially regulate the static pressure acting within said shuttle valve against opposite ends of said piston unit thereby controlling the position of said piston unit in said valve and the passage of fuel into said main jet nozzles, and signal reception means associated with said main control valve and said auxiliary control valves, and said servo valve mechanism for controlling the operations thereof.

References Cited by the Examiner
UNITED STATES PATENTS

| | | | |
|---|---|---|---|
| 2,890,843 | 6/59 | Attinello | 60—39.46 X |
| 2,974,594 | 3/61 | Boehm | 60—35.5 X |
| 3,015,210 | 1/62 | Williamson et al. | 60—35.53 |
| 3,115,887 | 12/63 | McCorkle | 60—35.54 X |

OTHER REFERENCES

Sung, C. B. et al.: "Reaction Controllers Maintain Attitude of Space Vehicles," Control Engineering, January 1960, page 151.

Stehling, K. R.: "Vernier Engines," Space/Aeronautics, August 1960.

MARK NEWMAN, *Primary Examiner.*
SAMUEL LEVINE, *Examiner.*